United States Patent

Shannon et al.

Patent Number: 6,005,665
Date of Patent: Dec. 21, 1999

[54] JOB ZONE FOR A HIGH PERFORMANCE NAVIGATION GRADE RATE SENSING COIL

[75] Inventors: John H. Shannon, Scottsdale; Andrew W. Kaliszek, Phoenix; William R. Schulzetenberg, Glendale, all of Ariz.

[73] Assignee: Honeywell, Inc., Minneapolis, Minn.

[21] Appl. No.: 09/222,606

[22] Filed: Dec. 29, 1998

[51] Int. Cl.$^6$ .................................................. G01C 19/72
[52] U.S. Cl. ............................................................. 356/350
[58] Field of Search ................................... 356/350, 345; 385/12; 250/227.19, 227.27

[56] References Cited

U.S. PATENT DOCUMENTS

| | | | |
|---|---|---|---|
| 4,699,451 | 10/1987 | Mohr | 350/96.15 |
| 4,702,599 | 10/1987 | Mohr | 356/350 |
| 4,743,115 | 5/1988 | Arditty et al. | 356/350 |
| 4,781,461 | 11/1988 | Baron et al. | 356/350 |
| 4,793,708 | 12/1988 | Bednarz | 356/350 |
| 4,856,900 | 8/1989 | Ivancevic | 356/350 |
| 4,883,337 | 11/1989 | Dahlgren | 350/96.29 |
| 5,074,665 | 12/1991 | Huang et al. | 356/350 |
| 5,168,539 | 12/1992 | Negishi et al. | 385/123 |
| 5,245,687 | 9/1993 | Usui | 385/134 |
| 5,333,214 | 7/1994 | Huang et al. | 356/350 |
| 5,351,900 | 10/1994 | Torney | 242/7.03 |
| 5,371,593 | 12/1994 | Cordova et al. | 356/350 |
| 5,405,485 | 4/1995 | Henderson et al. | 156/425 |
| 5,406,370 | 4/1995 | Huang et al. | 356/350 |
| 5,465,150 | 11/1995 | Malvern | 356/350 |
| 5,506,923 | 4/1996 | Goettsche et al. | 385/115 |
| 5,528,715 | 6/1996 | Goettsche et al. | 385/115 |
| 5,546,482 | 8/1996 | Cordova et al. | 385/12 |
| 5,552,887 | 9/1996 | Dyott | 356/350 |
| 5,742,390 | 4/1998 | Cordova et al. | 356/350 |
| 5,767,509 | 6/1998 | Cordova et al. | 250/227.19 |
| 5,767,970 | 6/1998 | Cordova et al. | 356/350 |
| 5,781,301 | 7/1998 | Ruffin | 356/350 |
| 5,818,590 | 10/1998 | Patterson | 356/350 |
| 5,822,065 | 10/1998 | Mark et al. | 356/350 |
| 5,847,829 | 12/1998 | Cordova et al. | 356/350 |

*Primary Examiner*—Samuel A. Turner
*Attorney, Agent, or Firm*—Albert K. Kau

[57] ABSTRACT

A fiber optic gyroscope that includes an improved winding transition section otherwise known as a "jog zone". The improved jog zone reduces losses due to micro-bends and cross-coupling in the fiber optic coil. The reduced losses enable a more accurate measurement of rotation rate of the fiber optic coil, while minimizing unwanted phase-shifts that can cause false readings in the fiber optic gyroscope.

7 Claims, 2 Drawing Sheets

JOB ZONE FOR A HIGH PERFORMANCE NAVIGATION GRADE RATE SENSING COIL

FIELD OF THE INVENTION

The present invention relates to the field of sensing coils for high-performance fiber optic gyroscopes. More specifically, the present invention pertains to an improved fiber optic gyroscope, which provides highly accurate rotation measurement with a sensing coil.

BACKGROUND

Fiber optic gyroscopes are used for detection of rotation particularly in navigation systems such as those used in aircraft and spacecraft. Fiber optic gyroscopes are desirable due to the high-level of accuracy and reliability of sensing inertial rotation rate that they possess.

Fiber optic gyroscope technology is well known in the industry. In a fiber optic gyroscope, light from a laser or some other light source is divided into two separate beams by means of a fiber optic coupler and then coupled into the two ends of a multi-turn coil of optical fiber. The fiber optic cable may consist of many of the standard types commercially available on the market. Light that emerges from the two fiber ends is combined by the fiber optic coupler and detected by a photodetector.

The fiber optic gyroscope senses rotation rate by detection of a rotationally induced phase shift between the light beams that propagate in opposite directions around the coil of the fiber optic cable. The signal that is detected corresponding to the phase difference between the counter-propagating beams is typically subjected to some form of phase modulation. The photodetector converts the modulated light beam to an electrical signal that corresponds to the rate of rotation of the coil of optical fiber. The signal is processed to provide a direct indication of the exact rate of rotation of the coil of optical fiber that has occurred.

Other physical phenomena may contribute to phase differences between the counter-propagating light beams than the mere physical rotation of the fiber optic gyroscope. Some of the most common performance limiting phenomena include: micro-bends in the fiber within the wound coil; polarization cross-coupling of the light within the coils; and most notably, the inconsistencies due to the winding process of the coil.

Losses due to micro-bends or any non-orthogonal relationship, between symmetrical points in the fiber optic coil and the center axis of the fiber optic coil are exacerbated by external temperature variations. When a thermal gradient passes through a fiber optic coil, the change in temperature produces a change in the refractive index of the material from which the fiber is made. An asymmetrical change in the refractive index of the fiber will cause a phase shift between the clockwise and counterclockwise paths of the rotating beams of light passing through the coil. Cross-coupling of the polarization states within the coil may also cause unwanted phase shifts.

Furthermore, when the winding process of the coil is more difficult, the machines used for winding the coil are more difficult to automate and maintain the precision winding pattern without excessively stressing the fiber. A poorly wound coil leads to the loss and polarization cross-coupling discussed above. If these external phenomena are introduced into the gyroscope, the unwanted phase shifts or losses cause the fiber optic gyroscope to indicate false measurements that translate into false readings of rotation rate.

The largest contributor to these losses and phase shifts occur in the region of the coil where each turn makes a transition to the next turn or wind. This section of each wrap is known as the "Jog Zone". In the past, the length of this zone was kept to a minimum. Unfortunately, a short jog zone will maximize these performance-limiting errors in high-performance fiber optic gyroscopes. In order to reduce the errors and sensitivities discussed above, it would be desirable to provide a new jog zone configuration that is independent of the coil configuration, i.e. quadrupole, octupole, interleave, or other variations thereof.

In the prior art, the length or angle of the jog zone was intentionally kept to a minimum in order to maximize the orthogonal winding section of the coil. U.S. Pat. No. 4,793,708 issued to Bednarz entitled "Fiber Optic Sensing Coil" teaches a symmetric fiber optic sensing coil for use in a rotation rate sensing device such as a gyroscope. This patent teaches that the jog zone of the fiber optic coil should consist of only 5 to 10% of the entire winding of the coil. Although this patent discloses that the jog zone is an essential portion of the entire winding of the coil, it does not suggest any basis for choosing the 5 to 10% figures. Furthermore, the patent does not teach that inherent advantages would exist by increasing the angle of the jog zone to a size that minimizes losses due to micro-bends, that when combined with external temperature fluctuations, can create unwanted phase shifts. The present application proposes the improved jog zone size that is entirely independent of the coil configuration.

SUMMARY OF THE INVENTION

It is an object of the present invention to provide an improved fiber optic gyroscope that increases performance for the fiber optic coil that minimizes losses due to micro-bends in the fiber within the wound coil.

It is a further object of the present invention to provide an improved jog zone size that minimizes birefringence that lowers induced polarization performance errors in the fiber optic gyroscope bias output. It is critical that the range of the angle of the jog zone from 45 degrees up to and including 90 degrees.

It is a further object of the present invention to provide an improved jog zone size that enables a smoother transition section for each successive wind in a fiber optic coil.

It is a further object of the present invention to provide a simplified coil winding automation that reduces jog acceleration as the winding in a fiber optic coil transitions from one turn to the next turn.

BRIEF DESCRIPTION OF THE DRAWINGS

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings wherein:

DESCRIPTION OF PREFERRED EMBODIMENTS

Figure 1:
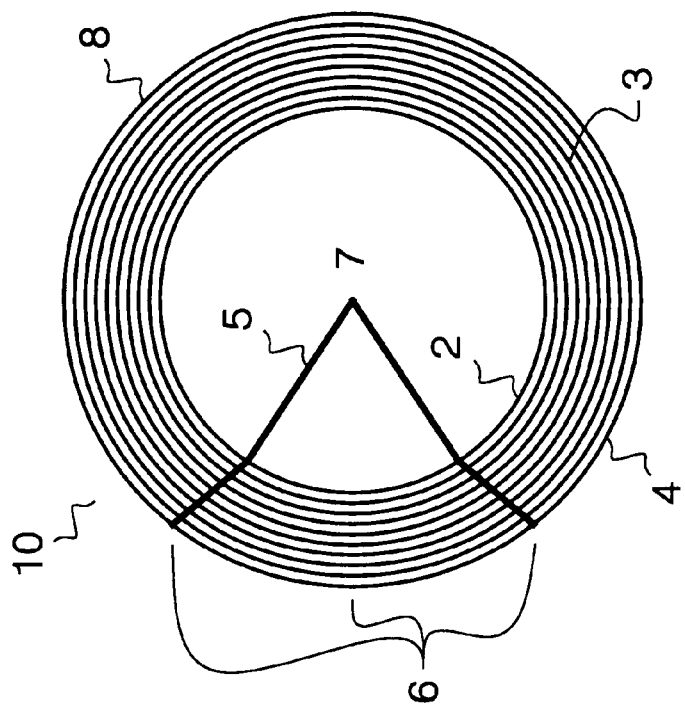
FIG. 1 is a side view of a generic fiber optic coil showing multiple windings and an approximated jog zone.

Turning now to the drawings, FIG. 1 is a side view of a fiber optic coil 10. The coil 10 shows multiple windings 4 of a fiber cable 3 in the coil 10. The windings in the cable 3 may consist of any mode of fiber such as single mode or PM fiber. Furthermore, the windings may be wound in any configuration or pattern. Some of the standard winding patterns include the quadrupole, octupole or interleave patterns.

Figure 3:
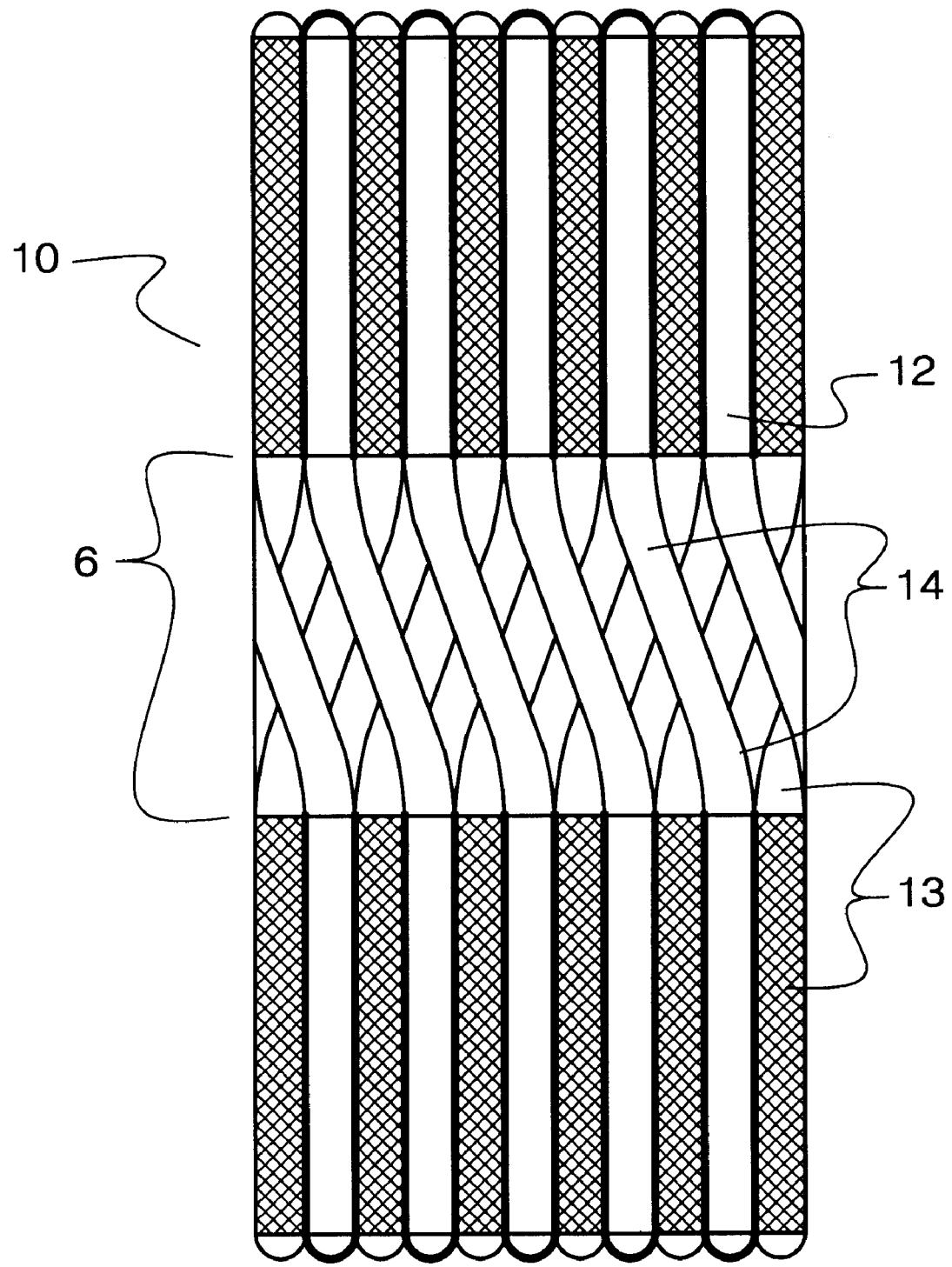
FIG. 3 is a top view of a fiber optic coil showing a detailed jog zone section that demonstrates the cross windings in the coil and the associated bend angles that occur in the jog zone.

Also shown in FIG. 1 is a jog zone 6. The jog zone 6 comprises the area of the coil 10 wherein the windings 4 of the cable 3 transition from one wind or turn to the next successive wind or turn of windings. It is generally desirable to maintain the windings 4 of the cable 3 in an orthogonal position relative to the coil axis of the coil 10. However, referring to FIG. 3 of the drawings, in the jog zone 6 wherein the winding transition takes place, the fiber cable 3 is angled slightly to achieve a smooth transition to successive windings of the coil. As can be seen, when oppositely wound portions 12 and 13 respectively of the fiber cable 3 transition from outside of the jog zone 6 through the jog zone 6, the wound portions 12 and 13 experience a slight bend angle 14 that achieves the smooth transition from one wound turn to the next successive wound turn. Experimental results have shown that the jog zone angle 5 as shown in FIG. 1 achieves optimum performance for the coil 10 at an angle 5 that is a minimum of 45 degrees during the first layer turn 2 of the fiber cable 3. It is possible to allow the jog zone angle 5 to grow in size to a maximum of 90 degrees as additional layers are added to the coil 10 depending on the specific winding pattern of the coil 10.

By increasing the jog zone angle 5 from the angle suggested in the prior art to the desired jog zone angle 5, the bend angles 14 entering and leaving the jog zone 5 are reduced. This reduction also reduces the localized bend loss at each bend of 12 and 13 which can become significant with two bends on each turn with a jog zone 5 on the coil. It is desirable to reduce the bend loss in order to reduce optical source power requirements for the coil 10 which thereby reduces sensitivity over a given temperature environment. By reducing the size of the bend angles 14, the coil 10 will also experience a drop in induced birefringence, thereby lowering induced polarization performance errors in the bias output of the coil 10, and simplifying the coil winding automation due to reduction in the jog acceleration as the fiber coil 3 transitions from one turn to the next.

Figure 2:
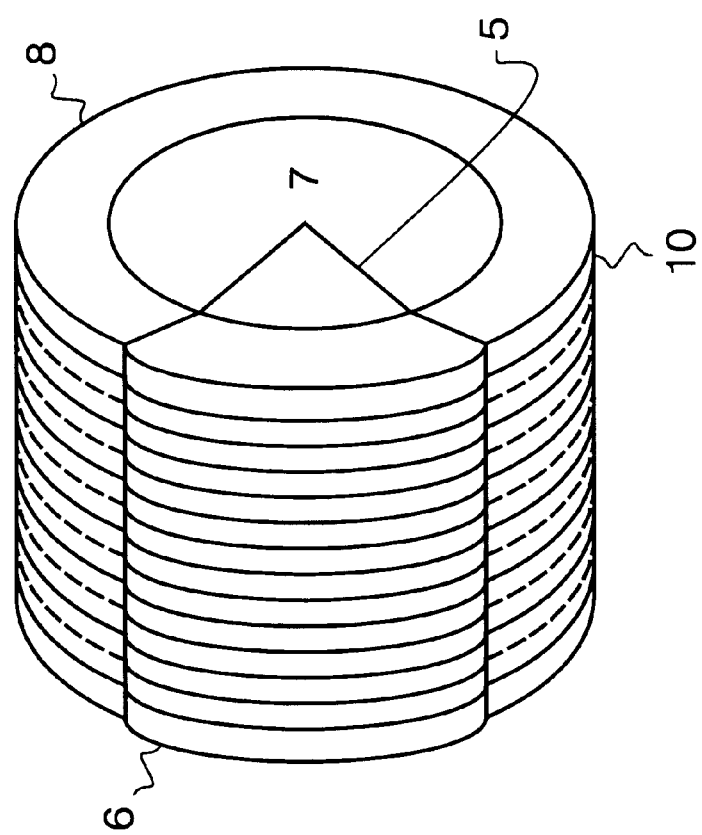
FIG. 2 is a perspective view of the generic fiber optic coil in FIG. 1 emphasizing the portion of the multiple windings that comprise the jog zone portion of the coil.

As shown in FIG. 2, the perspective drawing of the coil 10 highlights the jog zone 6 resulting from the increased jog zone angle 5.

While these descriptions directly describe the above embodiments, it is understood that those skilled in the art may conceive modifications and/or variations to the specific embodiments shown and described herein. Any such modifications or variations that fall within the purview of this description are intended to be included therein as well. It is understood that the description herein is intended to be illustrative only and is not intended to be limitative. Rather, the scope of the invention described herein is limited only by the claims appended hereto.

What is claimed is:

1. A fiber optic coil comprising:
   A. a coil axis,
   B. a continuously wound fiber optic cable having a plurality of substantially concentric layers,
      a. said plurality of substantially concentric layers comprising a plurality of substantially adjacent coil turns wound from said fiber optic cable,
      b. said coil turns of said fiber optic cable are wound in a predetermined pattern such that each said coil turn has a predictable position in the predetermined pattern,
      c. said coil turns of said fiber optic cable comprising a first zone and a jog zone,
         i. said first zone consisting of a substantially orthogonal turn relative to the coil axis,
         ii. said jog zone consisting of a bend angled coil turn with respect to said first zone, wherein the bend angled coil turn of the jog zone comprises at least 45 degrees of the coil turn.

2. The fiber optic coil of claim 1 wherein the bend angled coil turn of the jog zone comprises at least 45 degrees of the coil turn to a maximum of 90 degrees of the coil turn.

3. The fiber optic coil of claim 1 wherein the fiber optic cable consists of single mode fiber.

4. The fiber optic coil of claim 1 wherein the fiber optic cable consists of single mode polarization maintaining fiber.

5. The fiber optic coil of claim 1 wherein the predetermined pattern is a quadrupole pattern.

6. The fiber optic coil of claim 1 wherein the predetermined pattern is a octupole pattern.

7. The fiber optic coil of claim 1 wherein the predetermined pattern is an interleave pattern.

* * * * *